United States Patent
Batten et al.

(10) Patent No.: US 9,771,711 B1
(45) Date of Patent: Sep. 26, 2017

(54) INDOOR GREASE TRAP WITH MULTIPLE PLUMBER FITTING POSSIBILITIES

(71) Applicant: Thermaco, Inc., Greensboro, NC (US)

(72) Inventors: Randy Batten, Asheboro, NC (US);
William C Batten, Asheboro, NC (US);
Bruce W Kyles, Asheboro, NC (US);
Travis McBride, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 17 days.

(21) Appl. No.: 14/957,779

(22) Filed: Dec. 3, 2015

Related U.S. Application Data

(60) Provisional application No. 62/087,886, filed on Dec. 5, 2014.

(51) Int. Cl.
*E03F 5/16* (2006.01)
*B01D 17/02* (2006.01)
*C02F 1/40* (2006.01)

(52) U.S. Cl.
CPC ............ *E03F 5/16* (2013.01); *B01D 17/0211* (2013.01); *C02F 1/40* (2013.01)

(58) Field of Classification Search
CPC .......... E03F 5/16; C02F 1/40; B01D 17/0211; B01D 17/0214
USPC .................... 210/521, 532.1, 532.2, 538, 540
See application file for complete search history.

(56) References Cited

U.S. PATENT DOCUMENTS

| | | |
|---|---|---|
| 530,684 A | 12/1894 | Torrey |
| 773,362 A | 10/1904 | Anderson |
| 1,159,044 A | 11/1915 | Kelly, Jr. |
| 1,164,527 A | 12/1915 | Kelly, Jr. |
| 1,200,951 A | 10/1916 | Kelly, Jr. |
| 1,864,511 A | 6/1932 | Jones |
| 2,138,985 A * | 12/1938 | Seestedt ............ E03F 5/16 210/532.1 |
| 2,284,737 A * | 6/1942 | Hirshstein ............ E03F 5/16 210/540 |
| 2,792,125 A * | 5/1957 | Gallacher ............ C02F 3/28 210/532.2 |
| 3,365,060 A | 1/1968 | Hsu |
| 3,426,902 A | 2/1969 | Kilpert et al. |
| 3,872,017 A | 3/1975 | Bishop ............ 210/525 |
| 4,208,291 A | 6/1980 | Ochoa ............ 210/522 |

(Continued)

FOREIGN PATENT DOCUMENTS

| | | | |
|---|---|---|---|
| CH | 678-438 | 9/1991 | ........ E03F 5/16 |
| DE | 3215896 | 11/1983 | |

(Continued)

*Primary Examiner* — Christopher Upton
(74) *Attorney, Agent, or Firm* — MacCord Mason PLLC

(57) ABSTRACT

An apparatus for separating FOG from grey water in an effluent includes a housing having a first end having two plumbing fittings and a second end having one plumbing fitting. A baffle mounted inside the housing at the second end forms a barrier to flow of liquid toward the plumbing fitting on the second end above a certain height, and allows the flow of liquid past the barrier toward the plumbing fitting on the second end below the certain height. A conduit allows flow of liquid from past the baffle to one of the plumbing fittings on the first end. A plug closes one of the three plumbing fittings, and leaves the other two plumbing fittings available for connection to plumbing from a source of effluent and an outlet for grey water, respectively.

12 Claims, 3 Drawing Sheets

(56) References Cited

U.S. PATENT DOCUMENTS

| | | | |
|---|---|---|---|
| 4,235,726 A | 11/1980 | Shimko | 210/523 |
| 4,268,396 A | 5/1981 | Lowe | 210/670 |
| 4,400,274 A | 8/1983 | Protos | 210/302 |
| 4,472,277 A | 9/1984 | Bailey et al. | 210/238 |
| 4,651,762 A | 3/1987 | Bowden | 134/111 |
| 4,681,680 A | 7/1987 | DeIons et al. | 210/110 |
| 4,684,467 A | 8/1987 | Cloud | 210/519 |
| 4,789,487 A * | 12/1988 | Wallace | E03F 11/00 210/532.2 |
| 5,100,545 A | 3/1992 | Brooks | 210/194 |
| 5,133,881 A | 7/1992 | Miller et al. | 210/776 |
| 5,151,185 A | 9/1992 | Hammerschmitt | 210/521 |
| 5,167,815 A | 12/1992 | Bahmann et al. | 210/242.3 |
| 5,225,085 A | 7/1993 | Napier et al. | 210/705 |
| 5,344,566 A | 9/1994 | Clancey | 210/638 |
| 5,360,555 A | 11/1994 | Batten | 210/803 |
| 5,405,538 A | 4/1995 | Batten | 210/744 |
| 5,520,825 A | 5/1996 | Rice | 210/802 |
| 5,522,990 A | 6/1996 | Davidian | 210/242.3 |
| 5,560,826 A | 10/1996 | Szereday et al. | 210/522 |
| 5,714,069 A | 2/1998 | Sager | 210/519 |
| 5,827,425 A | 10/1998 | McKinnon | 210/194 |
| 5,861,098 A | 1/1999 | Morrison | 210/774 |
| 5,915,878 A | 6/1999 | Carpenter | 405/38 |
| 5,951,878 A | 9/1999 | Astrom | 210/791 |
| 5,971,163 A | 10/1999 | Gurfinkel | 210/514 |
| 5,993,646 A | 11/1999 | Powers | 210/86 |
| 6,056,128 A | 5/2000 | Glasgow | 210/521 |
| 6,059,963 A | 5/2000 | Horakova et al. | 210/143 |
| 6,235,201 B1 | 5/2001 | Smith et al. | 210/691 |
| 6,491,830 B1 | 12/2002 | Batten et al. | 210/803 |
| 6,517,715 B1 | 2/2003 | Batten et al. | 210/232 |
| 6,619,310 B2 | 9/2003 | Evanovich et al. | 137/15.18 |
| 6,800,195 B1 | 10/2004 | Batten et al. | 210/138 |
| 6,849,176 B1 | 2/2005 | Batten et al. | 210/97 |
| 7,153,439 B1 | 12/2006 | Batten et al. | 210/800 |
| 7,186,346 B1 | 3/2007 | Batten et al. | 210/776 |
| 7,208,080 B2 | 4/2007 | Batten et al. | 210/86 |
| 7,311,818 B1 | 12/2007 | Gurfinkel | 210/96.1 |
| 7,326,338 B2 | 2/2008 | Batten et al. | 210/187 |
| 7,431,852 B2 | 10/2008 | Batten et al. | 210/801 |
| 7,596,845 B2 | 10/2009 | Batten et al. | 29/407.05 |
| 2001/0027954 A1 | 10/2001 | Broeders et al. | 210/800 |
| 2002/0003104 A1 | 1/2002 | Evanovich et al. | 210/153 |
| 2003/0042213 A1 | 3/2003 | Hard | 210/807 |
| 2006/0054550 A1 | 3/2006 | Batten et al. | 210/523 |
| 2007/0251879 A1 | 11/2007 | Batten et al. | 210/532.1 |
| 2008/0061012 A1 | 3/2008 | Hodgekins et al. | 210/803 |
| 2008/0179262 A1 | 7/2008 | Batten et al. | 210/776 |
| 2008/0237121 A1 * | 10/2008 | Ismert | B01D 17/0214 210/538 |

FOREIGN PATENT DOCUMENTS

| | | | |
|---|---|---|---|
| DE | 19907840 | 8/2000 | C02F 1/40 |
| EP | 0555672 | 8/1993 | |
| GB | 10958 | 0/1914 | |
| GB | 2-216-821 | 10/1989 | E03F 5/16 |
| JP | 48-30826 | 9/1973 | |
| JP | 60-120022 | 6/1985 | |
| JP | 2009/262066 | 11/2009 | |
| NL | 8502-049 | 7/1985 | |
| SU | 1269-809 | 10/1983 | B01D 45/00 |
| WO | 00/66242 | 11/2000 | B01D 17/02 |

* cited by examiner

INDOOR GREASE TRAP WITH MULTIPLE PLUMBER FITTING POSSIBILITIES

BACKGROUND OF THE INVENTION

Separators to separate fats, oils and grease (FOG) from effluent have been around for a number of years. A common installation mode is to install the FOG separator in a commercial kitchen such as a kitchen of a restaurant, food service facility, or the like. The FOG separator is installed between the drain line of the ware washing sink and the connection to the sewer. Given that a wide range of kitchen geometries may be encountered, a plumber installing an FOG separator may be faced with challenges as to how to align the pipes from the ware washing sink correctly to the FOG separator and downstream from the FOG separator to the connection to the sewer.

Sometimes the two fittings will be suited to be on opposite sides of the FOG separator; sometimes they will be on the same end, or require extensive additional piping to line up correctly with the needs of the FOG separator. These challenges can provide extra cost and complication.

SUMMARY OF THE INVENTION

The present invention fulfills one or more of these needs in the art by providing an apparatus for separating FOG from grey water in an effluent. A housing has a first end having two plumbing fittings and a second end having one plumbing fitting. A baffle mounted inside the housing at the second end forms a barrier to flow of liquid toward the plumbing fitting on the second end above a certain height and allows the flow of liquid past the barrier toward the plumbing fitting on the second end below the certain height. A conduit allows flow of liquid from past the baffle to one of the plumbing fittings on the first end. A plug is included to close one of the three plumbing fittings, and leave available the other two plumbing fittings available for connection to plumbing from a source of effluent and an outlet for grey water, respectively.

Preferably, the housing and baffle are roto-molded. The housing may have an FOG separator positioned between the two ends to separate FOG stratified above the grey water. The FOG separator may include an oleophilic disk that rotates to pull FOG upward to be scraped off to a FOG collector. Typically, the plug and the conduit are removably connectable, to enable a plumber in the field to select where to connect the plug and conduit to meet a field installation need.

The invention can also be considered as a method of installing an apparatus for separating FOG from grey water in an effluent. The method includes positioning a housing having a first end having two plumbing fittings and a second end having one plumbing fitting between a source of effluent that contains FOG and a connection to a sewer. The so-positioned housing has a baffle mounted inside the housing at the second end that forms a barrier to flow of liquid toward the plumbing fitting on the second end above a certain height, and allows the flow of liquid past the barrier toward the plumbing fitting on the second end below the certain height. The method includes the following four acts, not necessarily in the order recited: a) connecting an inlet pipe to a fitting at an inlet position for the housing to receive effluent from the source of effluent that contains FOG, b) connecting an outlet pipe to a fitting at an outlet position for the housing to discharge grey water to the sewer, c) arranging for a fitting in the housing that is neither the inlet position nor the outlet position to be plugged, and d) installing a conduit within the housing from the outlet position to the baffle.

The arranging step may include installing a plug. Alternatively, the arranging step may include removing plugs from the inlet position and the outlet position. The method may include installing a FOG separator between the two ends to separate FOG stratified above the grey water.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
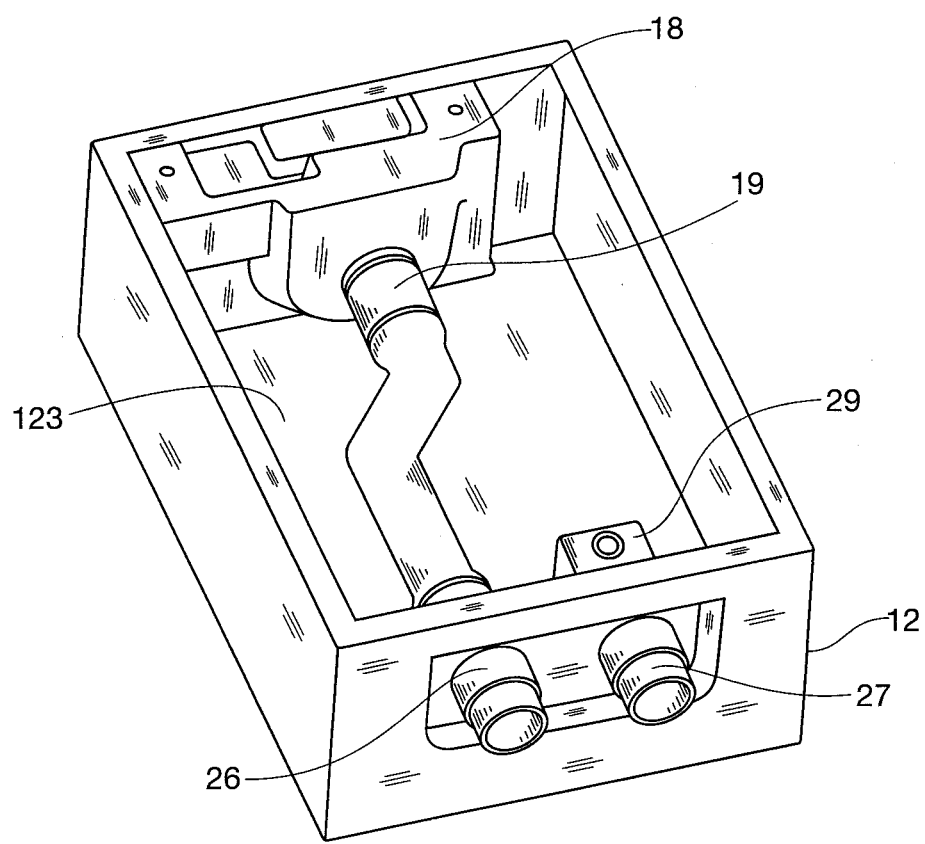
FIG. 1 is a top perspective view of the inside of a housing in accordance with an embodiment of the invention.
Figure 2:
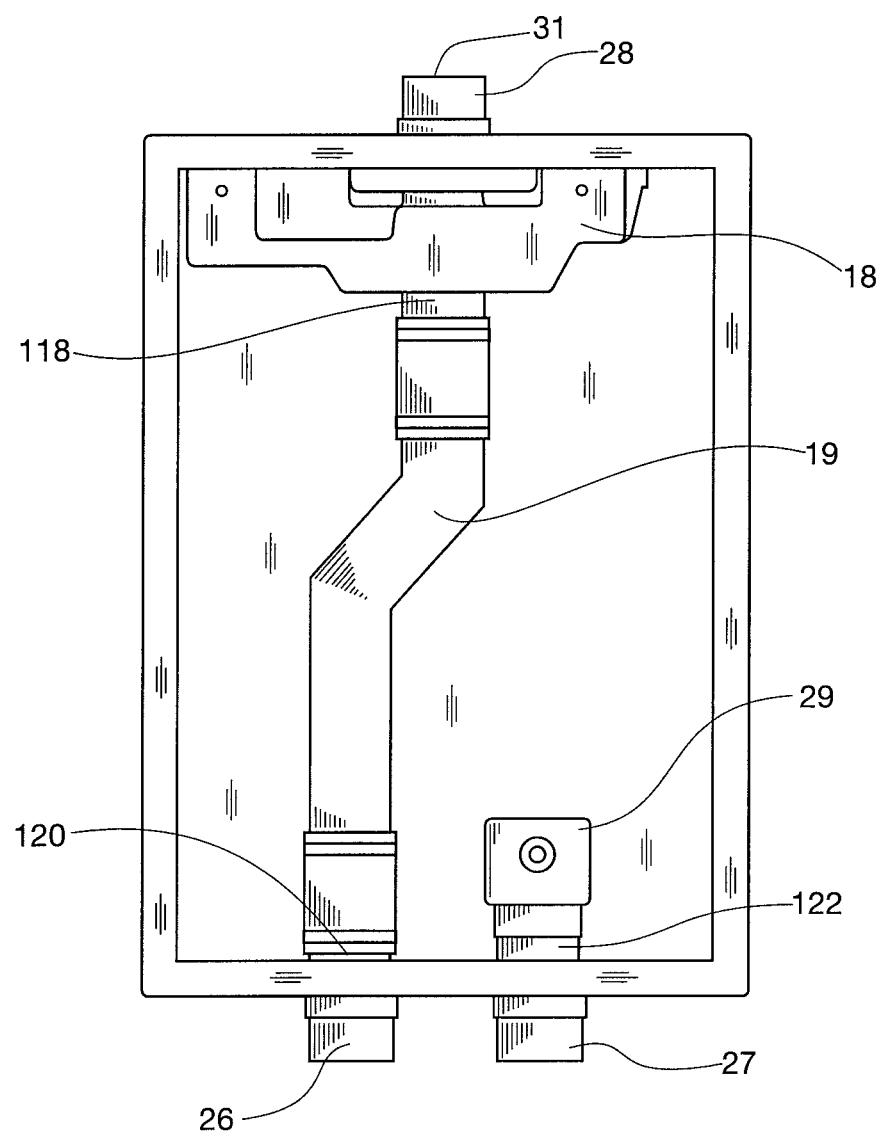
FIG. 2 is a plan view of the inside of the housing of FIG. 1.

As seen in FIGS. 1 and 2, a housing 12 is provided with two fittings 26 and 27 at one end and another fitting 28 (see FIG. 2) at the other end. Shrouding the fitting 28 is a baffle 18 that extends downwardly toward, but not all the way to, the bottom 123 of the housing 12. The baffle may have a top closed against the inside wall of the housing 12. The two fittings 26 and 27 on the one end of the housing 12 extend inwardly to provide pipe fittings 120 and 122 inside the housing 12. Similarly the baffle 18 has a pipe fitting 118 provided on it leading to its interior.

The housing 12 is provided with a cover (not shown in FIGS. 1 through 3) and can serve as a grease trap by itself, simply allowing FOG levels to build up in the housing 12 as effluent passes through it.

The connection of the housing to an effluent source such as a kitchen sink drain and a downstream sewer fitting can take numerous configurations. In the view of FIG. 2, a plug 31 is used to close off the fitting 28. A conduit 19 is connected at the fittings 120 and 118 to establish a flow path from the fitting 26 to the inside of the baffle housing 18. In this configuration the fitting 27 can be made the inlet with the effluent being discharged through the discharge 29 (see FIG. 2) into the interior of the housing 12. As the effluent resides in the housing 12, the FOG, which is normally lighter than water, can rise to the top of the effluent held in the housing 12. The grey water near the bottom 123, therefore, will be relatively free of FOG and can pass under the baffle 18, through the conduit 19 and exit at fitting 26 to the sewer (not shown) connected at fitting 26.

In a different configuration selected at installation, the plug can be located in the fitting 26 and not at 28, so that the grey water (the effluent less the FOG) can exit through the fitting 28 (free of a plug) to the connected sewer fitting.

Alternatively, the fitting 26 can be plugged, the outlet to the sewer can be connected using fitting 28, the fitting 118 in the baffle 18 can be plugged, and the conduit 19 can be deleted.

In a further installation option, the conduit 19 can be connected between fitting 118 and fitting 122, with fitting 26 serving as the inlet, fitting 28 being plugged and fitting 27 serving as the outlet to the connected sewer fitting.

As demonstrated, this housing construction enables the sewer fitting to be connected at the same side as the effluent inlet, or opposite side, allowing the installer freedom to configure the FOG separator as needed for the environs he or she confronts. Also, either of the fittings 26 and 27 can be selected as the inlet with the other being plugged or connected as the outlet.

Figure 3:
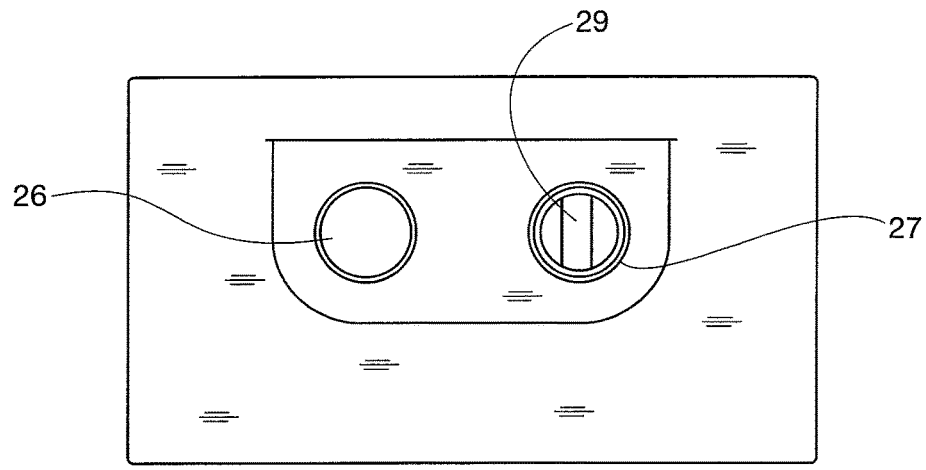
FIG. 3 is an outside end view of one end of the housing of FIG. 1.

FIGS. 1 through 3 show a simple grease trap which holds the FOG above the grey water. Periodic servicing can remove the FOG that has collected at the top of the body of effluent in housing 12. The apparatus, however, can receive additional equipment to facilitate FOG removal. Several ways to remove the collected FOG can be used, including the version seen in FIG. 4 involving a rotating disk skimmer.

Figure 4:
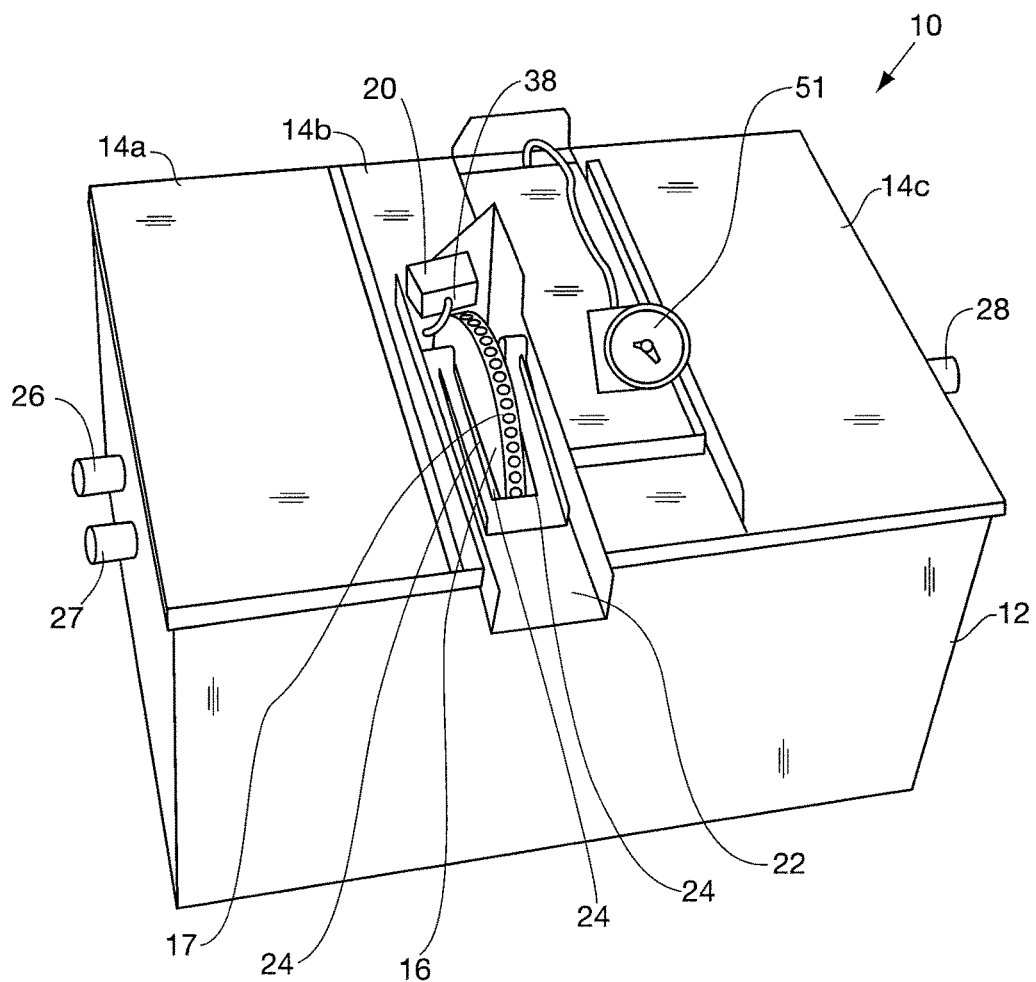
FIG. 4 is a perspective view of the housing with disk skimmer.

As best seen in FIG. 4, the FOG removal assembly 10 includes a container 12 with sectional covers 14a, 14b, and 14c. In a preferred embodiment as seen in FIG. 4, the sectional covers are separate plates, preferably stainless steel. The assembly 10 has at least one rotatable disk 16 (shown in FIG. 4) supported by the center sectional cover 14b. FIG. 4 also depicts a gear drive motor 20 and a trough 22 which are attached to the center sectional cover 14b. As seen in FIG. 4, the trough 22 has scraper blades 24. The gear drive motor 20 supports and rotates the drive sprocket 38 which is cooperatively meshed with peripheral holes in the disk 16.

The separator has a rotating oleophilic disk 16 that is driven for rotation to pick up grease that accumulates at the top of the water held within the outer housing or tank 12. A collection container can be positioned to catch the oil/grease draining from the trough 22. These types of grease removal models are known as disk skimmers and are disclosed in U.S. Pat. No. 5,133,881, entitled "Assembly for Oil and Grease Removal from Drain Water Mounted to Facilitate Parts Replacement," the entire disclosure of which is incorporated by reference. They are available as the Big Dipper line of FOG separators from Thermaco, Inc., of Asheboro, N.C. Other types of supplemental separators in the housing to remove the lighter liquid (FOG) from the inner volume of the housing can be used. Those options include belts that pass through the liquid.

Alternatively, the housing 12 can be built to include an openable valve for period removal of collected FOG. An example of this is seen in the application entitled "Improved Economical Waste Removal System For Fat, Oil and Grease" described in International Patent Publication WO-2014-082037, the entire disclosure of which is incorporated herein by reference. That apparatus enables FOG to be removed from the housing with an openable valve apparatus, with the FOG level being determined by a sight glass indicate when FOG removal is appropriate.

A variation within the scope of the broadest claims calls for all three plumbing fittings 26, 27 and 28 to initially be plugged. In the field a plumber can select two plugs for removal to meet a field installation need. This can entail removing plugs from the inlet position and the outlet position.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for separating FOG from grey water in an effluent comprising a housing having a first end having two plumbing fittings and a second end having one plumbing fitting, a baffle mounted inside the housing at the second end forming a barrier to flow of liquid toward the plumbing fitting on the second end above a certain height, a plumbing fitting in the baffle for connection to a conduit to allow the flow of liquid past the barrier toward the plumbing fitting on the second end below the certain height, and a plug to close one of the three plumbing fittings on the housing, and leaving available the other two plumbing fittings on the housing for connection to plumbing from a source of effluent and an outlet for grey water, respectively.

2. An apparatus as claimed in claim 1 wherein the housing and baffle are roto-molded.

3. An apparatus as claimed in claim 1 wherein the housing has an FOG separator positioned between the two ends to separate FOG stratified above the grey water.

4. An apparatus as claimed in claim 3 wherein the FOG separator includes an oleophilic disk that rotates to pull FOG upward to be scraped off to a FOG collector.

5. An apparatus as claimed in claim 1 further comprising a conduit having two ends, one of the two ends connected to the plumbing fitting of the baffle to allow flow of liquid from past the baffle to the other end of the conduit, which is connected to one of the plumbing fittings on the first end.

6. An apparatus as claimed in claim 5 wherein the plug and the conduit are removably connectable, to enable a plumber in the field to select where to connect the plug and conduit to meet a field installation need.

7. An apparatus as claimed in claim 5 wherein all three plumbing fittings are initially plugged, to enable a plumber in the field to select two plugs for removal to meet a field installation need.

8. An apparatus for separating FOG from grey water in an effluent comprising a roto-molded housing having a first end having two plumbing fittings and a second end having one plumbing fitting, a roto-molded baffle mounted inside the housing at the second end forming a barrier to flow of liquid toward the plumbing fitting on the second end above a certain height, a plumbing fitting in the baffle for connection to a conduit to allow the flow of liquid past the barrier toward the plumbing fitting on the second end below the certain height, a conduit connectable to the plumbing fitting in the baffle and to one of the plumbing fittings on the first end to allow flow of liquid from past the baffle to the plumbing fitting on the first end connected to the conduit, a plug to close one of the three plumbing fittings, and leaving available the other two plumbing fittings for connection to plumbing from a source of effluent and an outlet for grey water, respectively, wherein the plug and the conduit are removably connectable, to enable a plumber in the field to select where to connect the plug and conduit to meet a field installation need, and an FOG separator positioned between the two ends to separate FOG stratified above the grey water including an oleophilic disk that rotates to pull FOG upward to be scraped off to a FOG collector.

9. A method of installing an apparatus for separating FOG from grey water in an effluent comprising a sewer, the housing having a baffle mounted inside the housing at the second end, the baffle having a plumbing fitting and forming a barrier to flow of liquid toward the plumbing fitting on the second end above a certain height, and allowing the flow of liquid past the barrier toward the plumbing fitting on the second end below the certain height, and the following four acts, not necessarily in the order recited:

connecting an inlet pipe to a fitting at an inlet position for the housing to receive effluent from the source of effluent that contains FOG, connecting an outlet pipe to a fitting at an outlet position for the housing to discharge grey water to the sewer, arranging for a fitting in the housing that is neither the inlet position nor the outlet position to be plugged, and installing a conduit within the housing from the outlet position to the plumbing fitting of the baffle.

10. A method as claimed in claim 9 including installing a FOG separator between the two ends to separate FOG stratified above the grey water.

11. A method as claimed in claim 9 wherein the arranging step includes installing a plug.

12. A method as claimed in claim 9 wherein the arranging step includes removing plugs from the inlet position and the outlet position.

\* \* \* \* \*